United States Patent [19]
Wolff et al.

[11] Patent Number: 5,122,291
[45] Date of Patent: Jun. 16, 1992

[54] THERMAL INSULATING MATERIAL BASED ON PIGMENT CONTAINING SILICA AEROGELS

[75] Inventors: Bernardo Wolff, Mannheim; Manfred Mielke, Heidelberg; Guenther Seybold, Neuhofen; Werner Ostertag, Gruenstadt; Jochen Fricke, Gerbrunn; Roland Caps, Lauffen, all of Fed. Rep. of Germany

[73] Assignee: BASF Aktiengesellschaft, Ludwigshafen, Fed. Rep. of Germany

[21] Appl. No.: 519,103

[22] Filed: May 4, 1990

[30] Foreign Application Priority Data

May 5, 1989 [DE] Fed. Rep. of Germany ....... 3914850

[51] Int. Cl.$^5$ .................... C09C 1/28; C01B 33/154
[52] U.S. Cl. .................... 252/62; 106/475; 252/315.6; 252/587
[58] Field of Search ............ 252/315.6, 587, 62; 106/475; 423/338

[56] References Cited

U.S. PATENT DOCUMENTS

| | | | |
|---|---|---|---|
| 3,669,899 | 6/1972 | Vassiliades et al. | 252/316 |
| 3,840,382 | 10/1974 | Burke | 106/475 |
| 4,011,096 | 3/1977 | Sandell | 106/475 |
| 4,212,925 | 7/1980 | Kratel et al. | 252/62 |
| 4,221,672 | 9/1980 | McWilliams | 252/62 |
| 4,403,023 | 9/1983 | Reiss | 429/120 |
| 4,667,417 | 5/1987 | Graser et al. | 34/9 |
| 4,786,618 | 11/1988 | Shoup | 252/315.6 |
| 4,954,327 | 9/1990 | Blount | 252/315.6 |

FOREIGN PATENT DOCUMENTS

| | | |
|---|---|---|
| 13387 | 7/1980 | European Pat. Off. . |
| 2103243 | 5/1978 | Fed. Rep. of Germany . |
| 2806367 | 8/1978 | Fed. Rep. of Germany . |
| 3038142 | 4/1982 | Fed. Rep. of Germany . |

*Primary Examiner*—Prince Willis, Jr.
*Assistant Examiner*—J. Silbermann
*Attorney, Agent, or Firm*—Oblon, Spivak, McClelland, Maier & Neustadt

[57] ABSTRACT

A thermal insulating material based on a pigment-containing silica aerogel is obtainable by a) reacting an aqueous dispersion of sodium silicate and a pigment with a strong acid or sodium silicate with a pigment-containing strong acid to give a pigment-containing silica hydrogen, the pigment being such that it scatters, absorbs or reflects infrared radiation of wavelength 3-10 μm, b) substantially freeing the resulting pigment-containing silica hydrogel from ionic constituents by washing with water, c) displacing the water in the hydrogen by a low-boiling liquid which is inert toward the pigment-containing silica gel, d) heating the liquid-containing silica gel thus obtained under supercritical conditions while completely covered with the liquid, and e) subsequently removing the liquid from the solid by flash vaporization at supercritical temperature.

8 Claims, No Drawings

THERMAL INSULATING MATERIAL BASED ON PIGMENT CONTAINING SILICA AEROGELS

The present invention relates to a novel thermal insulating material based on a pigment-containing silica aerogel, obtainable by a) reacting an aqueous dispersion of sodium silicate and a pigment with a strong acid or sodium silicate with a pigment-containing strong acid to give a pigment-containing silica hydrogel, the pigment being such that it scatters, absorbs or reflects infrared radiation of wavelength 3–10 $\mu$m, b) substantially freeing the resulting pigment-containing silica hydrogel from ionic constituents by washing with water, c) displacing the water in the hydrogel by a low-boiling liquid which is inert toward the pigment-containing silica gel, d) heating the liquid-containing silica gel thus obtained under supercritical conditions while completely covered with the liquid, and e) subsequently removing the liquid from the solid by flash vaporization at supercritical temperature.

The present invention further relates to the production of this thermal insulating material.

Thermal insulating materials on an inorganic basis differ from organic materials, e.g. plastic foams, in particular by a wider thermal application range which extends from room temperature to 650° C.

Pourable thermal insulating materials of natural origin are minerals such as perlite, vermiculite and silica gel, the insulating effect of which, however, is not sufficient for many purposes.

A more effective insulating material is a synthetic silica gel, for example a finely divided silica gel as obtainable by flame hydrolysis. In flame hydrolysis, a volatile silicon compound such as silicon tetrachloride is decomposed in a detonating gas flame. The resulting primary particles are then agglomerated into particulate aggregates. Disadvantages of these materials are the heat conductivity which increases strongly with increasing temperature, the pronounced dusting, and the instability of loose beds as required for an insulating effect.

Silica aerogels as described for example in U.S. Pat. No. 4,667,417 have these disadvantages only to a minor extent, but they are still not fully satisfactory. These gels are obtained by precipitating silica from sodium silicate with an acid, washing the ionic constituents out of the hydrogel with water, displacing the water by a low-boiling water-soluble organic liquid such as methanol, heating the resulting alcogel in the presence of this liquid under supercritical pressure to supercritical temperature, and removing the liquid by flash vaporization at the supercritical temperature. If desired, the water-soluble liquid can be exchanged with a water-insoluble organic liquid or else liquid carbon dioxide prior to the supercritical drying.

Voluminous and large-pored silica gel formed in the course of this drying process can be converted by grinding into a granular form and is mechanically relatively stable, so that bed volumes virtually do not decrease and particularly highly insulating beds result. An advantageous method for producing small aerogel particles comprises according to DE-A-2 103 243 spraying sodium silicate and an acid from a mixing nozzle, the particles obtained being droplet shaped.

Whereas the efficient barrier effect provided by these aerogels against contact heat is virtually temperature independent, the transmittance of radiative heat (infrared radiation) increases with increasing temperature. For this reason the silica gels as described for example in DE-A-2 806 367 and DE-C2-3 038 142 have been mixed with pigments which scatter, absorb or reflect infrared radiation in particular within the range from 3 to 10 $\mu$m, so that the insulating layer also becomes substantially non-transmitting in respect of this radiation. However, production of such mixtures with a uniform pigment distribution is technically difficult. Moreover, it is generally necessary in these cases to include reinforcing agents such as ceramic fibers. EP-A1-13 387 describes a process for producing pigment-containing finely divided silica by direct coagglomeration of components during or after decomposition by flame hydrolysis. The prior mixtures can only be used in a compacted form, and in particular the pulverulent mixtures must not be put under any mechanical stress, since they tend to separate.

It is an object of the present invention to remedy these defects.

We have found that this object is achieved by the thermal insulating material defined at the beginning.

The present invention also provides the corresponding process for producing this material.

The pigment-containing silica aerogel according to the present invention is a temperature resistant, low-density, high-porosity matrix into which the pigment particles are incorporated. Characteristic data are a density of from 70 to 500 kg/m$^3$, porosities of from 77 to 97% and average pore diameters of from 0.01 to 0.05 $\mu$m. At room temperature, a granulated silica aerogel of density 200 kg/m$^3$ will have a thermal conductivity of from 0.022 to 0.030 W/mK (depending on the particle size), which is always stated in respect of a midpoint temperature and defined as follows:

$$\text{Thermal conductivity } \lambda = \frac{\text{power } [W]}{\text{length } [m] \cdot \text{temperature } [K]}$$

Suitable pigments for scattering, absorbing or reflecting infrared radiation of wavelength from 3–10 $\mu$m are in particular carbon black, titanium dioxide, chromite $Cr_xFe_{2-x}O_3$ (x=0.3–2.0), magnetite $Fe_3O_4$, red sludge, mica, talcum, copper and mixtures of these pigments, although the use of carbon black and magnetite is limited to temperatures below 400° C. and 250° C. respectively, because of their vulnerability to oxidation. Further suitable pigments are oxides such as aluminum oxide, chromium(III) oxide, tin ore, manganese(III) oxide, manganese dioxide, zirconium dioxide, ilmenite $FeTiO_3$, spinel $MgAl_2O_4$ and cobalt spinel $CoAl_2O_4$, alumosilicates such as clays and metal carbides, silicides and nitrides, polymeric complex metal cyanides such as Prussian blue, elemental metals such as aluminum, manganese, iron, nickel, palladium, platinum, silver and gold, organic dyes such as ultramarine and phthalocyanines, and carbon fibers from 1 to 20 $\mu$m in diameter and from 2 to 200 $\mu$m in length.

The pigment content of the pigment-containing silica aerogel can range from 0.5 to 75% by weight, preferably from 5 to 40% by weight, small amounts being sufficient in particular in the case of very finely divided pigments.

Advantageously, more than 90% of the pigment particles have a largest dimension within the range from 0.01 to 20 μm. As we have observed, incorporation of these particles leaves the silica matrix intact.

Although, considered by itself, the pigment has a higher thermal conductivity than the silica gel, the presence of the pigment increases the insulating effect of the silica gel, in particular at high temperatures. A prerequisite is a homogeneous distribution of the pigment particles in the matrix, which is achieved by the process according to the present invention.

Starting materials for the production of the thermal insulating material according to the present invention are commercial aqueous sodium silicate solutions, which are preferably diluted to concentrations of from 10 to 20% by weight of $SiO_2$, and an acid, preferably from 20 to 40% strength by weight sulfuric acid or from 50 to 98% strength by weight formic acid.

The pigment to be added is dispersed in either or both solutions with the aid of stirred apparatus such as dissolvers or dispermates and other dispersing machines such as bead mills or attritors. In some cases it is advisable to add a dispersant, preferably sodium ligninsulfonate, in amounts of from 5 to 10% by weight, based on the pigment, to reduce the agglomeration of the primary pigment particles.

By slowing down the rate of sedimentation of the pigments, which have higher specific gravity, it is additionally possible to obtain homogeneous mixing of the starting components. To this end, the acid can be admixed before the pigmenting with from 0.1 to 10% by weight, based on the pigment to be added, of a thickener, preferably finely divided silica.

The reaction between the starting materials may be carried out either batchwise or continuously.

In batchwise working, the pigment-containing acid is preferably introduced first, and the sodium silicate solution is added dropwise with vigorous stirring and cooling, preferably at from 0° to 5° C., until the resulting sol has a pH of from 2 to 9, preferably from 3 to 5. If there is a threat of sedimentation, the sol is stirred until the onset of gelling, so that the hydrogel is obtained in pieces; otherwise, a continuous hydrogel structure is obtained.

In a preferred embodiment of continuous working, the starting solutions are intensively mixed in a conventional manner in a mixing nozzle. The rate of addition of the components is selected in such a way that the resulting sol has a pH of from 6 to 8, preferably 7, and, on falling under gravity through air, solidifies in the form of droplets which are collected in a water tank.

The further processing of the resulting pigment-containing hydrogel is the same in both cases.

To effect a substantial removal of the ionic constituents, a wash with water can be preceded by a wash with an acid, preferably with 0.005 M sulfuric acid or 0.01 M hydrochloric acid.

To displace the water in the pigment-containing hydrogel it is possible to use in particular methanol, but also ethanol, n-propanol or isopropanol. These liquids may if desired be replaced in a second step by a further liquid, for example liquid carbon dioxide.

The supercritical drying to give the pigment-containing silica aerogel is carried out in a conventional manner in the vicinity of the critical point, in the case of suspension in methanol preferably at from 240° to 270° C. under from 80 to 100 bar.

If desired, the supercritical drying can be combined in a conventional manner with a hydrophobizing treatment by the addition of an organosilicon compound such as dimethyldimethoxysilane.

The material obtained in the batchwise process can be ground and thus comminuted into granules having an average largest dimension of from 0.01 to 15 mm; the resulting bulk densities are within the range from 50 to 800 kg/m$^3$. It is also possible to cast the metastable sol intermediate in the form of a shaped article.

If spraying is employed, the droplet shaped aerogel particles, which are notable for particularly good free-flow properties, have minimum particle diameters of from 0.5 to 1 mm, and are completely free of any dust.

The thermal insulating material according to the present invention is notable for a homogeneous distribution of the pigment in the silica aerogel matrix which, unlike the prior art materials formed by powder mixing, even withstands severe mechanical stresses and/or sustained use, for example vibration, so that there is no separation of the constituents and there is no need to add further assistants to stabilize the mixture. Consequently, the product according to the present invention is also pneumatically conveyable. In granule form, its pourability and good flow properties and also the low, if not completely nonexistent, dust content make it suitable for use as a thermal insulation bed material which, unlike materials based on finely divided silica, is capable of supporting its own weight and possesses vacuum stability. The thermal conductivity λ of the material according to the present invention is distinctly reduced compared with non-pigment-containing silica aerogel, in particular at elevated temperature, being less than 0.055 W/mK at 200° C. and being 0.170–0.200 W/mK at 650° C. By comparison, the thermal conductivity of a pigment-free silica aerogel of bulk density 140 kg/m$^3$ is 0.057 W/mK at 150° C., 0.160 W/mK at 250° C. and more than 0.350 W/mK at 600° C.

These thermal conductivities and those reported in the Examples which follow were measured within the midpoint temperature range from 0° to 50° C. using the heat flux measuring plate instrument specified in German Standard Specification DIN 52616 and within the midpoint temperature range from 100° to 600° C. by the two-plate method in line with German Standard Specification DIN 52616.

EXAMPLE 1

12 kg of carbon black were introduced into 490 kg of 32% strength by weight sulfuric acid containing 1.2 kg of sodium ligninsulfonate and were dispersed therein by stirring with a dissolver (toothed disk 30 cm in diameter) at 1,000 rpm for 30 minutes. This dispersion was intensively mixed with dilute sodium silicate solution (15% by weight of $SiO_2$) in a nozzle at a pressure of 2.5 bar. The mixing ratio was adjusted in such a way that the sol emerging from the nozzle after a residence time therein of not more than 0.1 s had a pH of 7.1±0.1.

The droplets then gel in the air and are collected in a water tank where they were washed with water until the $Na_2O$ content, based on the dried hydrogel beads, had dropped to 0.04% by weight. After 3 hours' washing with 56 l of methanol (in a column of 8 l capacity and 10 cm internal diameter), the water content of the small gel spheres was below 1% by weight.

The dripping wet pigment-containing methanol silica gel was admixed with a further 4 l of methanol and then heated in an autoclave (25 cm internal diameter, 6.5 cm high) under nitrogen to 270° C. in the course of 6 h while the pressure was limited to 90 bar. Thereafter the contents were depressurized under isothermal conditions in the course of 30 min. After cooling down, the product was removed from the autoclave and further dried at 0.2 bar and 80° C. for about 12 h.

The product obtained is characterized by the data listed in Table 1.

EXAMPLE 2

Starting from 204.3 kg of 32% strength by weight sulfuric acid to which 3.3 kg of finely divided silica and 19.4 kg of rutile of average primary particle size 1.2 μm were added, Example 1 was repeated following dispersing for 2 hours.

Characteristic data see Table 1.

COMPARATIVE EXAMPLE C

Example 1 was repeated to prepare a silica aerogel which contained no pigment and no other additives either and whose characteristic data are listed for comparison in Table 1.

TABLE 1

| Example | 1 | 2 | C |
|---|---|---|---|
| Pigment content | 5% by weight of carbon black | 8.5% by weight of rutile | pigment free |
| Average particle size of granules | 3 mm | 3 mm | 3 mm |
| True density | 256 kg/m$^3$ | 251 kg/m$^3$ | 230 kg/m$^3$ |
| Apparent (bulk) density | 147 kg/m$^3$ | 152 kg/m$^3$ | 140 kg/m$^3$ |
| Thermal conductivity λ | | | |
| at 10° C. | 0.025 W/mK | 0.022 W/mK | 0.023 W/mK |
| at 150° C. | 0.041 W/mK | 0.039 W/mK | 0.057 W/mK |
| Gas flows required for pneumatic transport through a pipe diameter of | | | |
| 30 mm | — | 1000 l/h | 1500 l/h |
| 45 mm | — | 2500 l/h | 3500 l/h |

The materials according to the present invention (Examples 1 and 2) have a distinctly reduced thermal conductivity at 150° C.

The good pneumatic transportability of the materials according tot the present invention is evident from Example 2.

EXAMPLE 3

1.6 g of finely divided silica, 0.84 g of sodium ligninsulfonate and 8.4 g of furnace black (average primary particle size 0.021 μm) were dispersed in 149.2 ml of 86% strength by weight of formic acid by stirring in a laboratory disperser at 2000 rpm for 15 minutes. The average agglomerate size was 6.5 μm. This dispersion was admixed at 0-5° C. with 339 ml of sodium silicate solution (18% by weight of SiO$_2$) added with continuous stirring.

The hydrogel which formed within a few minutes was mechanically comminuted and washed in a column first with water, then with 1% strength by weight sulfuric acid (12 l in 6 h) and then again with water. The conductivity of the wash liquor at the end was less than 30 μsiemens. This was followed by washing with methanol until the water content of the methanol runoff had dropped to below 0.5% by weight.

The black-containing methanol silica gel was introduced into an autoclave of 20 l internal capacity and topped up with methanol until the autoclave was half full. After 500 ml of dimethyldimethoxysilane had been added as water repellent, Example 1 was repeated.

| | |
|---|---|
| Calculated black content | 9.9% by weight |
| Carbon content | 16.6% by weight |
| Average size of granules after grinding | 0.5 mm |
| Thermal conductivity λ at 260° C. | 0.043 W/mK |
| Degree of water repellency | floats on water for longer than 24 h |

EXAMPLES 4 TO 10

The reaction of Example 3 was carried out in the course of 30 s and with stirring until the onset of gelling (10-15 min). Starting solutions were 255 g of 88% strength by weight formic acid (solution 1), into which a certain amount of pigment (see Table 2) was dispersed (Examples 9 and 10: 10-fold stirrer speed), and 495 g of a sodium silicate solution containing 18% by weight of SiO$_2$ (solution 2).

The resulting gel was kept immersed in deionized water for 6 h, comminuted and then likewise first washed with water (until the conductivity of the wash liquor dropped to below 100 μsiemens), then with 0.1% strength by weight sulfuric acid (24 l in 12 h) and again with water until pH-neutral. This is followed by a wash with methanol until the water content of the methanol runoff was less than 0.3% by weight.

The supercritical drying was carried out as in Example 3. The final six hours' drying was carried out at 0.2 bar and 200° C.

Characteristic data for the ground products obtained are listed in Table 2.

TABLE 2

| Example | 4 | 5 | 6 | 7 | 8 | 9 | 10 |
|---|---|---|---|---|---|---|---|
| Pigment | 13.5 g of carbon black | 26.9 g of TiO$_2$ (rutile) | 26.9 g of red sludge | 26.9 g of Fe$_3$O$_4$(345) | 26.9 g of Fe$_3$O$_4$(5001) | 26.9 g of Cr$_{1.4}$Fe$_{0.06}$O$_3$ | 4.5 g of Cu 9.0 g of TiO$_2$ (ground for 12 h) 9.0 g of Cr$_{1.4}$Fe$_{0.6}$O$_3$ |
| Additives | 1.35 g of finely divided SiO$_2$, 0.67 g of Na ligninsulfonate | none | none | none | none | none | none |
| Primary particle size in μm | <0.1 | 1.1 | 0.5-1 | 0.5 | 0.25 | 0.15 | Cu 1-10 TiO$_2$ 1 Cr 0.15 |
| Agglomerate size of pigment | 14.4 | 5.9 | 3.5 | 5.4 | 8.5 | 5.8 | Cu 18.1 TiO$_2$ 2.9 |

TABLE 2-continued

| Example | 4 | 5 | 6 | 7 | 8 | 9 | 10 |
| --- | --- | --- | --- | --- | --- | --- | --- |
| in solution 1 in μm | | | | | | | Cr 4.1 |
| Calculated pigment content in % by weight | 13.0 | 23.2 | 23.2 | 23.2 | 23.2 | 23.2 | Cu 4.0 TiO$_2$ 8.1 Cr 8.1 |
| Average size of granule particles in mm | 1.3 | 1.3 | 1.3 | 1.3 | 1.3 | 1.4 | 2.4 |
| Bulk density in kg/m$^3$ | 182 | 193 | 200 | 199 | 178 | 200 | 205 |
| Thermal conductivity at midpoint temperature in W/mK (T in °C.) | 0.041(240) | 0.048(280) 0.173(600) | 0.060(240) | 0.045(200) | 0.046(200) | 0.062(250) | 0.045(190) |

EXAMPLE 11

The reaction is carried out as described in Example 3, except for differences in the stirrer speeds and reaction times used. The starting solutions used were 1530 g of 87% strength by weight formic acid, into which 329.9 g of rutile were dispersed (1000 rpm, 30 min, average agglomerate particle size 5.1 μm compared with their average primary particle size of 1.1 μm), and 2970 g of sodium silicate solution (18% by weight of SiO$_2$). The addition took place in the course of 8 minutes and stirring was continued at 7000 rpm for a further 10 minutes until the onset of gelling.

Aging overnight and mechanical comminution were followed by washing as described in Example 3, except that 0.1% strength by weight sulfuric acid was used. A subsequent 20-hour wash with 20 l of methanol was carried on to a residual water content of 3% by weight.

After a supercritical drying carried out as described in Example 3, further drying was carried out at 0.2 bar and 200° C. for 14 h.

Characteristic data of the ground product obtained are listed in Table 3.

EXAMPLE 12

Example 11 was repeated. The pigment component comprised 161.5 g of ground mica (muscovite, average primary particle size 17 μm, average agglomerate particle size 19.9 μm), which were stirred in at 8000 rpm in the course of 10 min.

The wash with methanol was carried on to a residual water content of 1.1% by weight.

Characteristic data see Table 3.

TABLE 3

| Example | 1 | 2 |
| --- | --- | --- |
| Calculated pigment content | 38% by weight of rutile | 23% by weight of mica |
| Average size of granule particles | 1.2 mm | 1.3 mm |
| Bulk density | 282 kg/m$^3$ | 166 kg/m$^3$ |
| Thermal conductivity λ | | |
| at 260 or 210° C. | 0.053 W/mK | 0.055 W/mK |
| at 596° C. | 0.203 W/mK | — |

EXAMPLE 13

80.9 g of sodium silicate solution (18% by weight of SiO$_2$) were added dropwise with stirring to 27.4 g of 32% strength by weight sulfuric acid at 0-5° C. in the course of one minute, and the resulting mixture was seeded with a few Glauber salt crystals. After 30 minutes the sodium sulfate decahydrate formed was filtered off, and 3 g of finely divided silica and 50 g of rutile were intensively stirred into the filtrate. The resulting rutile-containing sol was poured into plastics molds (diameter 5 cm, height 0.5 cm) and, after gelling (about 1 min), washed with water until pH-neutral. The methanolic wash was carried on to a residual water content of less than 0.3% by weight. The subsequent supercritical drying was carried out as described in Example 3.

The resulting disks of rutile-containing silica aerogel were mechanically intact and had a pigment content of 72% by weight and a true density of 790 kg/m$^3$.

EXAMPLE 14

Example 13 was repeated, except that the pigmenting was effected by the addition of 3 g of finely divided silica and a mixture of 5 g of sodium ligninsulfonate and 50 g of carbon black, which were first ground together and then pasted up with a small amount of methanol.

The resulting disks of black-containing silica aerogel, which were likewise mechanically intact, had a pigment content of 71% by weight and a true density of 340 kg/m$^3$.

We claim:

1. A thermal insulating material based on a pigment-containing silica aerogel, obtainable by
    a) reacting an aqueous dispersion of sodium silicate and a pigment with a strong acid or sodium silicate with a pigment-containing strong acid to give a pigment-containing silica hydrogel, the pigment being such that it scatters, absorbs or reflects infrared radiation of wavelength 3-10 μm,
    b) substantially freeing the resulting pigment-containing silica hydrogel from ionic constituents by washing with water,
    c) displacing the water in the hydrogel by a low-boiling liquid which is inert toward the pigment-containing silica gel,
    d) heating the liquid-containing silica gel thus obtained under supercritical conditions while completely covered with the liquid, and
    e) subsequently removing the liquid from the solid by flash vaporization at supercritical temperature.

2. A thermal insulating material as claimed in claim 1, wherein the pigment content is from 0.5 to 75% by weight.

3. A thermal insulating material as claimed in claim 2, wherein the pigment content is from 5 to 40% by weight.

4. A thermal insulating material as claimed in claim 1, wherein the reaction product formed in stage (a) of claim 1 is cast as a shaped article before being gelled to form the coherent silica hydrogel.

5. A thermal insulating material as claimed in claim 1, wherein the silica aerogel obtainable in stages (d) and (e) of claim 1 has been comminuted into free-flowing granules having an average largest dimension of from 0.01 to 15 mm.

6. A thermal insulating material as claimed in claim 1, obtainable by reacting the components of stage (a) in a mixing nozzle and spraying the reaction product in the form of fine droplets.

7. A thermal insulating material as claimed in claim 1, wherein the supercritical treatment in stage (d) has been carried out in the presence of an organosilicon compound hydrophobizing agent.

8. A process for preparing a thermal insulating material on the basis of a pigment-containing silica aerogel, which comprises
   a) reacting an aqueous dispersion of sodium silicate and a pigment with a strong acid or sodium silicate with a pigment-containing strong acid to give a pigment-containing silica hydrogel, the pigment being such that it scatters, absorbs or reflects infrared radiation of wavelength 3–10 $\mu$m,
   b) substantially freeing the resulting pigment-containing silica hydrogel from ionic constituents by washing with water,
   c) displacing the water in the hydrogel by a low-boiling liquid which is inert toward the pigment-containing silica gel,
   d) heating the liquid-containing silica gel thus obtained under supercritical conditions while completely covered with the liquid, and
   e) subsequently removing the liquid from the solid by flash vaporization at supercritical temperature.

* * * * *